US007021332B2

(12) United States Patent
Greenwood et al.

(10) Patent No.: US 7,021,332 B2
(45) Date of Patent: Apr. 4, 2006

(54) HYDRAULIC VALVE SECTION WITH REDUCED BORE DISTORTION

(75) Inventors: Jason Greenwood, Butler, WI (US); Dennis R. Barber, Oconomowoc, WI (US)

(73) Assignee: HUSCO International, Inc., Waukesha, WI (US)

( * ) Notice: Subject to any disclaimer, the term of this patent is extended or adjusted under 35 U.S.C. 154(b) by 194 days.

(21) Appl. No.: 10/811,402

(22) Filed: Mar. 26, 2004

(65) Prior Publication Data

US 2005/0211320 A1 Sep. 29, 2005

(51) Int. Cl.
*F16K 11/07* (2006.01)

(52) U.S. Cl. ...................................... 137/596; 137/884

(58) Field of Classification Search ................ 137/269, 137/271, 596, 625.25, 625.69, 884
See application file for complete search history.

(56) References Cited

U.S. PATENT DOCUMENTS 4,453,565 A * 6/1984 Neff ........................... 137/596
4,693,272 A * 9/1987 Wilke ......................... 137/596
4,782,859 A * 11/1988 Constantinian .......... 137/596.2
5,529,088 A * 6/1996 Asou .......................... 137/343
5,715,865 A * 2/1998 Wilke ......................... 137/596
6,036,107 A * 3/2000 Aspen et al. ............... 239/170
6,745,793 B1 * 6/2004 Rudle .................... 137/596.16

OTHER PUBLICATIONS

"Model 5000 Sectional Valve", HUSCO International Catalog, 2000, 34 Pages, Waukesha, USA.

* cited by examiner

*Primary Examiner*—John Fox
(74) *Attorney, Agent, or Firm*—George E. Haas; Quarles & Brady LLP

(57) ABSTRACT

A spool valve section for a multiple valve assembly has a body with two opposing side surfaces. A plurality of mating surfaces are raised from each side surface. The mating surfaces surround the openings of fluid passages through the section and apertures for fasteners that secure the assembly together. The mating surfaces are spaced from a region of each side surface that is adjacent a bore in the body that receives a control spool. The fluid passages also are spaced from and do not intersect the spool bore. These characteristics of the spool valve section reduce distortion of the spool bore which could otherwise result from the pressure and fastening forces in the valve assembly.

20 Claims, 2 Drawing Sheets

HYDRAULIC VALVE SECTION WITH REDUCED BORE DISTORTION

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to hydraulic valves, and in particular to valve assemblies having a plurality of sections butted together to control several functions of a machine.

2. Description of the Related Art

Construction and agricultural machines employ a hydraulic system to operate different mechanical devices. For example a backhoe is a common earth moving machine that has a bucket attached to the end of an arm which in turn is coupled by a boom to a tractor. Separate hydraulic cylinders are connected between adjacent ones of those elements to produce movement of one with respect to the other, which operation is commonly referred to as a "function" of the machine. The machine operator controls a given function by operating a valve that governs the flow of pressurized fluid from a pump to the associated cylinder and back to a tank. Hydraulic motors and other types of actuators also are used to move machine elements.

Each valve is part of an assembly that controls the operation of several machine functions. In the case of a backhoe, an assembly of four valves may be provided in the assembly to swivel and tilt the boom, move the arm, and tilt the bucket. U.S. Pat. No. 4,693,272 describes a typical valve assembly having a plurality of individual sections butted side by side, with each section containing one of the control valves and associated components. Each valve section has a bore in which a control spool slides to meter fluid between a pair of workports and the supply and tank return lines.

The valve sections have through passages for the supply line, tank return line, and load sense circuit. When a plurality of these sections are butted side by side these passages align to convey fluid through the entire assembly. It is common in prior designs, the through passages intersect the spool bore so that the fluid flows around the control spool from one section to another. The high pressure and pressure changes in these fluid passages as compared to other regions of the valve section commonly produced physical distortion of the spool bore. Another common feature that contributed to bore distortion was a bridge galley used in the valve section to convey pressurized fluid between portions of the spool bore.

The valve sections are bolted between end sections that have ports to connect the supply and tank hoses to the assembly. Heretofore a relatively large contact area was machined on opposite side walls of each valve section to provide surfaces against which the adjacent assembly sections abutted. The through passages had openings in those surfaces which aligned with similar openings in the abutting section. Unless the large contact area was machined extremely flat and parallel to the area on the opposite side surface, proper contact with the abutting section was not achieved and the assembly fastening force distorted the valve section and its spool bore.

Therefore it is desirable to design a valve section in which the effects of these distortion producing characteristics are minimized.

SUMMARY OF THE INVENTION

A valve section for a multiple hydraulic valve assembly comprises a body with first and second side surfaces and an end surface. A bore extends into the body from the end surface. A plurality of primary mating surfaces are raised from locations on the first side surface that are remote from a region of the first side surface adjacent the bore. A plurality of secondary mating surfaces are raised from locations on the second side surface which are remote from a region of the second side surface adjacent the bore. The primary mating surfaces are adapted to mate with the secondary mating surface of another valve section, and the secondary mating surfaces are adapted to mate with a primary mating surface of yet another valve section.

The body includes a plurality of common passages that are spaced from the bore. For example, the common passages convey supply fluid from a pump, convey fluid back to a hydraulic system tank, and form part of a load sense circuit. Each common passage extends between one of the plurality of primary mating surfaces and one of the plurality of secondary mating surfaces. A plurality of passageways connect the bore and each of the plurality of common passages. A control spool is slidably received in the bore and meters fluid to and from a function of a machine.

DETAILED DESCRIPTION OF THE INVENTION

Figure 1:
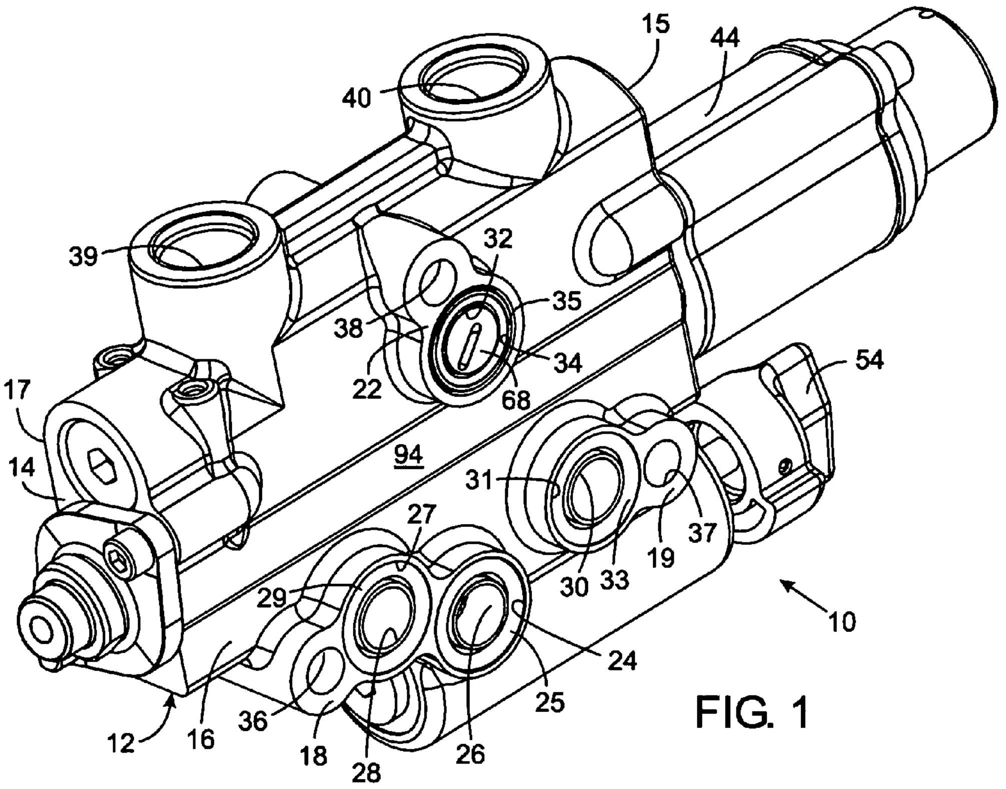
FIG. 1 is an isometric view of a valve section according to the present invention.
Figure 2:
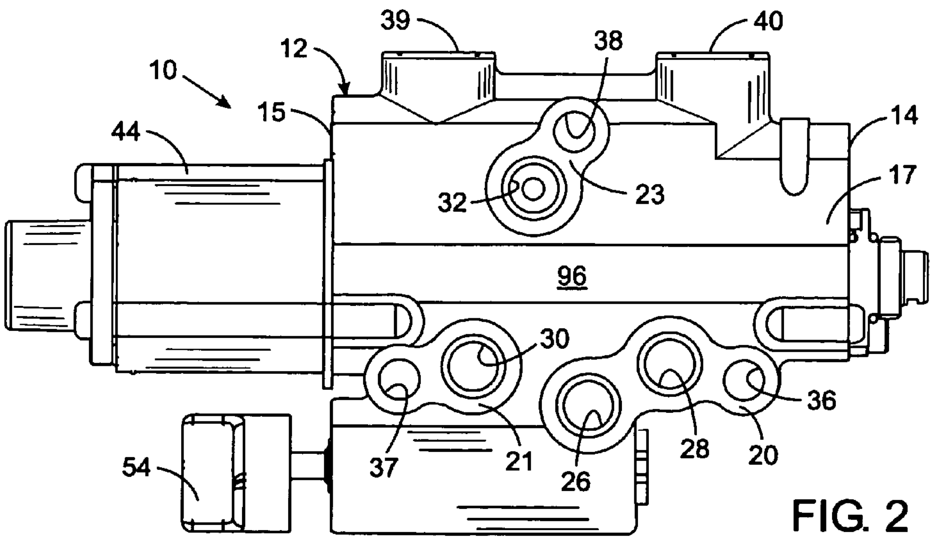
FIG. 2 is an elevational view of the rear of the valve section in FIG. 1.

With initial reference to FIGS. 1 and 2, a valve section 10 for a multi-valve assembly has a metal body 12 with a pair of opposing end surfaces 14 and 15. First and second side surfaces 16 and 17 are on opposite sides of the body 12 extending the between the end surfaces 14 and 15. A first mating surface 18 and a second mating surface 19 are raised outwardly from the first side surface 16 and both are machined to be coplanar. A third mating surface 20 is raised outwardly from the second side surface 17 directly on the opposite side of the valve body 12 from the first mating surface 18 and has a mirror image shape. A fourth mating surface 21 also is raised outwardly from the second side surface 17 opposite to and is the mirror image of the second mating surface 19. A fifth mating surface 22 is elevated from the first side surface 16 of the body 12 and a mirror image sixth mating surface 23 is elevated from the second side surface 17. The first, second and fifth mating surfaces 18, 19 and 22 form a plurality of primary mating surfaces that are coplanar. The third, fourth and sixth mating surfaces 20, 21 and 23 form a plurality of secondary mating surfaces that are coplanar to each other. The plane of the first, second and fifth mating surfaces 18, 19 and 22 is parallel to the plane of the third, fourth and sixth mating surfaces 20, 21 and 23 on the opposite side of the valve body 12. As will be described, this parallel relationship enables a plurality of valve sections 12 to be connected side-by-side to form a multi-valve assembly.

A plurality of common passages extend from one side of the body 12 to the opposite side. Specifically, a supply passage 26 runs from the first mating surface 18 to the opposite third mating surface 20. A first circular groove 24 surrounds the opening of the supply passage 26 through the first mating surface 18 and a first annular seal 25 is within that groove. A first tank passage 28 also extends between the first and third mating surfaces 18 and 20. A second circular groove 27 surrounds the opening of the first tank passage 28 through the first mating surface 18 and has a second annular seal 29 therein. A second tank passage 30 has openings in the second and fourth mating surfaces 19 and 21 on opposite sides of the body 12. A third circular groove 31 extends around the opening of the second tank passage 28 through the second mating surface 19 and receives a third annular seal 33. A load sense passage 32 runs between the fifth mating surface 22 and the sixth mating surface 23. A fourth circular groove 34 surrounds the opening of the first tank passage 28 through the first fifth surface 22 and has a fourth annular seal 35 therein.

Three fastener apertures also extend between the opposite sides of the valve body 12. A first fastener aperture 36 is between the first and third mating surfaces 18 and 20 and a second fastener aperture 37 runs from the second mating surface 19 to the fourth mating surface 21. The third fastener aperture 37 is between the fifth and sixth mating surface 22 and 23. As will be described, these fastener apertures receive bolts which secure a plurality of valve sections together in a side-by-side manner.

A pair of workports 39 and 40 open through the upper surface of the valve body 12 in the orientation of the valve section 10 illustrated in FIGS. 1 and 2. The workports 39 and 40 are threaded to receive fittings of hoses that lead to a hydraulic actuator on the machine.

Figure 3:
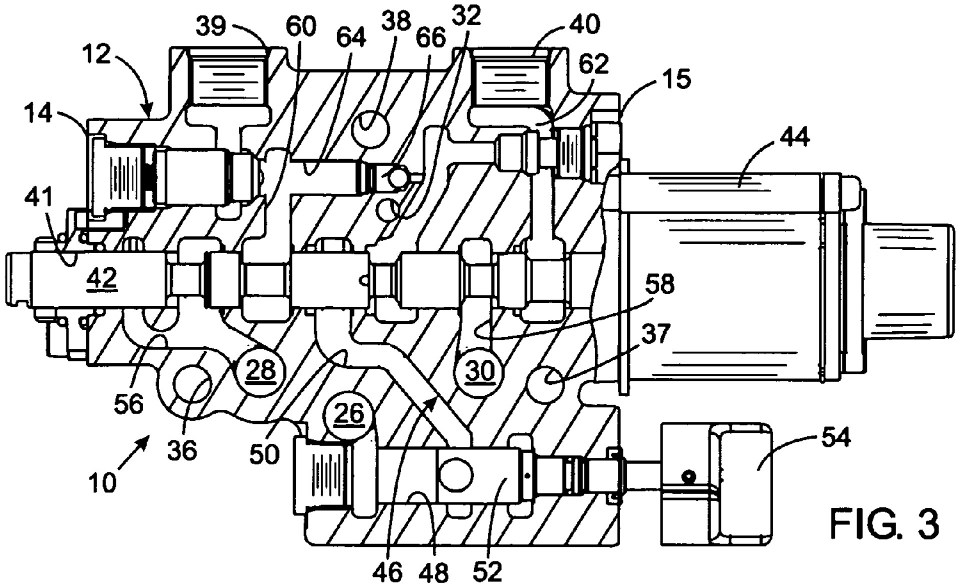
FIG. 3 is a longitudinal cross-sectional view through the valve section.

FIG. 3 illustrate an example of the interior of the valve section 10 with the understanding that depending on the requirements of the machine function being controlled a particular valve section include check valves, a pressure compensator and other types of flow control devices. The illustrated valve section 10 has a bore 41 extending between the end surfaces 14 and 15 and having a number of lands with chambers formed there between. A conventional control spool 42 is slidably received within the bore 41 and has a plurality of annular groves so as to control the flow of fluid between the bore chambers as the control spool slides within the body, as is well known for spool valves. An actuator 44, such as an electric solenoid, is mounted to the second end 15 of the body 12 to exert a force which produces the bidirectional motion of the control spool 42. Other types of electrical actuators or a mechanical linkage can be used alternatively to move the control spool 42.

Each of the supply passage 26, the first and second tank return tank return passages 28 and 30, and the load sense passage 32 are spaced from the bore 41. In previous spool valve designs, one or more of these passages crossed through the bore at a chamber that allowed fluid to flow around the spool from one side of the valve section to the other. Under some circumstances, the section to section fluid flow through these passages distorted the valve bore or spool, thereby adversely affecting the valve operation. In the present design, these passages 28, 30 and 32 are remote from the bore 41, thereby distancing the forces produced by the flow through the valve section 10.

As a result of that separation, the supply passage 26 is connected to the bore by a first passageway 46 formed by a portion of an aperture 48 beneath the bore and a supply conduit 50. A manually operated flow control regulator 52 is located within that aperture 48 and has a shaft projecting outwardly from the valve body 14 on which a knob 54 is attached. A second passageway 56 couples the first tank return passage 28 to the bore 41, and a third passageway 58 similarly couples the second tank return passage 30 to the bore 41. A pair of workport passageways 60 and 62 respectively connect the first and second workports 39 and 40 to the spool bore. A cross passage 64 extends between the two workport passageways 60 and 62 and has a first shuttle valve 66 therein which selectively applies the highest of the two workport pressures to a second shuttle valve 68 located in the load sense passage 32 (FIG. 1). The second shuttle valve 68 chooses the greater of either the selected workport pressure from this valve section or the pressure from an adjacent valve section applied to the opening the load sense passage 32 at the sixth mating surface 23. That chosen pressure appears at the opening of the load sense passage 32 in the fifth mating surface 22. Therefore, the combination of the two shuttle valves 66 and 68 passes the highest workport pressure from either an adjacent valve section or the present valve section onward to another valve section that abuts the fifth mating surface 22.

Figure 4:
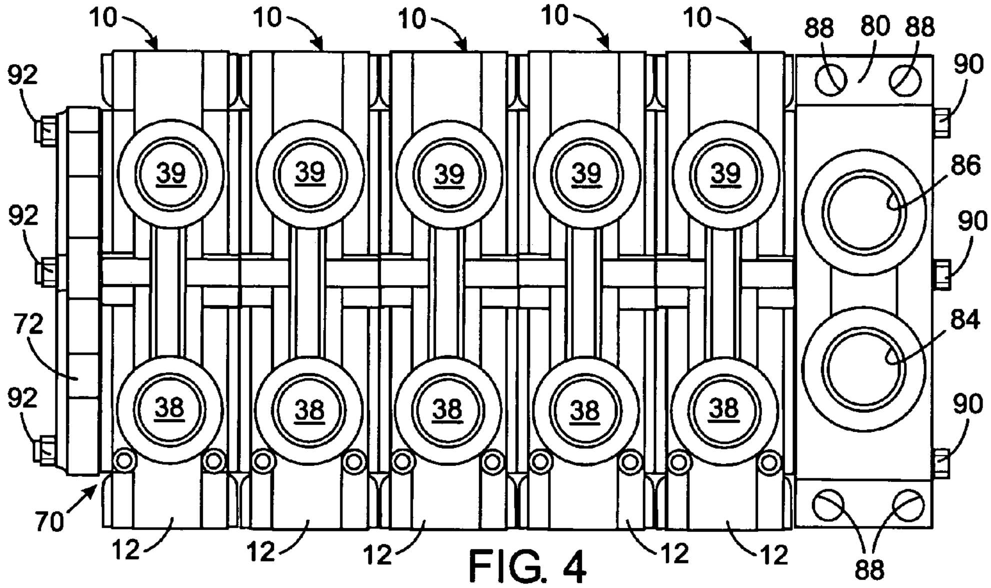
FIG. 4 is a top view of an assembly of several valve sections.

Referring now to FIG. 4, a plurality of valve sections 12 can be butted together side-by-side in a series to form a valve assembly 70. The first, second and fifth mating surfaces on one side of each valves section 10 respectively abut the third, fourth and sixth mating surfaces of an adjacent valve section. For ease of illustration, the valve assembly 70 does not include the actuators and other external components required to be inserted into the body 12 for the functional assembly.

Figure 5:
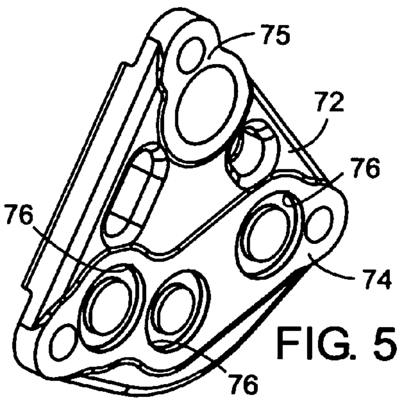
FIGS. 5 and 6 are isometric views of opposite sides of an end cap of the assembly.
Figure 6:
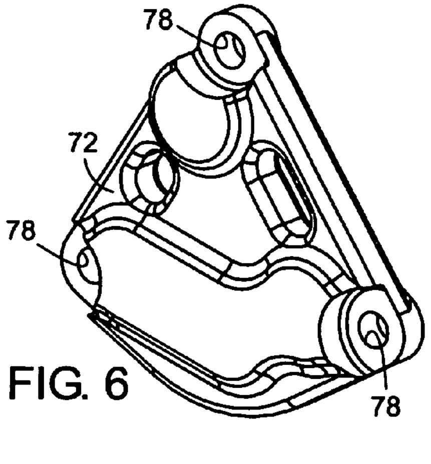

An end cap 72 abuts the exposed third, fourth and sixth mating surfaces of the valve section at one end of the series of sections. The adjoining side of the end cap 72 is shown in FIG. 5 and has two raised mating surfaces 74 and 75 which abut the mating surfaces 20, 21 and 23 on that end valve section. Note that a single one of these mating surfaces 74 engages the third and fourth mating surfaces 20 and 21 on the end valve body. The end cap mating surfaces 74 and 75 have annular grooves 76 which receive sealing rings (not shown) to thereby close the respective ends of the supply passage 26 and the first and second tank return passages 28 and 30. A similar sealing mechanism is provided on mating surface 75 which closes the load sense passage 32. FIG. 6 shows the outer side of the end cap 72. The end cap has a generally triangular shape with a fastening aperture 78 proximate to the apexes of the triangle. These fastening apertures 78 align with the fastening apertures 36, 37 and 38 through valve sections 10.

A ported end section 80 is located at the opposite end of the valve assembly 70. An inlet port 84 of the ported end section 80 is coupled to the supply passage 26 and enables a supply hose to be attached to the valve assembly 70. An outlet port 86 on the ported end section 80 leads to the first and second tank return lines 28 and 30 and receives a hose for the tank of the hydraulic system. An additional port (not shown) on the side of the ported end section 80 is provided for an external connection to the load sense passage 32. The ported end section 80 also has a plurality of apertures 88 to bolt the valve assembly 70 to the frame of the machine on which it is being used.

Three bolts 90 extend through apertures in the ported end section 80, the fastening apertures 36, 37 and 38 in each valve section 10, and the apertures 78 in the end section 72 at which a nut 92 is threaded onto each bolt and tightened to secure the valve assembly together. Because the fastening apertures 36, 37 and 38 of each valve section 10 extend through the mating surfaces 18, 19, 20, 21, 22 and 23, the force exerted by the bolts is applied to the those mating surfaces. The size of the mating surface areas also has been reduced from that of prior spool valve sections. These characteristics allow the amount of torque required to hold multiple valve sections together to be reduced, which minimizes distortion of the spool bore 41 from the fastening force.

Spool bore distortion also is minimized by spacing the common passages 26, 28, 30, and 32 from the spool bore area, reducing the size of the mating surface area between sections, and placing those mating surface areas outside the regions 94 and 96 of the first and second side surfaces 16 and 17, respectively, which are adjacent to the spool bore 41 within the valve body 12 (see FIGS. 1 and 2). Thus, pressure forces within those common passages and the fastening forces that hold the valve assembly 70 together are spaced from those body regions 94 and 96, thus minimizing distorting effects those forces could have on the valve bore. Another feature that contributes to reducing potential bore distortion is the elimination of an internal "bridge" galley used in prior valve designs to distribute high pressure fluid to different sections of the bore.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

We claim:

1. A valve section for a multiple section hydraulic valve assembly comprising:

a body having first and second side surfaces and an end surface, a bore extending into the body from the end surface, a plurality of primary mating surfaces raised from locations on the first side surface remote from a region of the first side surface that is adjacent the bore, a plurality of secondary mating surfaces raised from locations on the second side surface remote from a region of the second side surface that is adjacent the bore, wherein the plurality of primary mating surfaces are adapted to mate with a secondary mating surface of another valve section and the plurality of secondary mating surfaces are adapted to mate with a primary mating surface of yet another valve section, the body further including a plurality of common passages spaced from the bore and each extending between one of the plurality of primary mating surfaces and one of the plurality of secondary mating surfaces;

a plurality of passageways connecting the bore to each of the plurality of common passages; and a control spool slidably received in the bore.

2. The valve section as recited in claim 1 further comprising a plurality of fastener apertures extending between the plurality of primary mating surfaces and the plurality of secondary mating surfaces for securing the valve section to the other valve section.

3. The valve section as recited in claim 1 further comprising an annular groove in one of the plurality of primary mating surfaces and extending around at least one of the plurality of common passages.

4. The valve section as recited in claim 3 further comprising a seal in each annular groove.

5. The valve section as recited in claim 1 further comprising a workport communicating with the bore for connecting a hydraulic conduit to the valve section.

6. A valve section for a multiple section hydraulic valve assembly comprising:

a body having first and second side surfaces and an end surface, a bore extending into the body from the end surface, a first mating surface and a second mating surface both raised from locations on the first side surface that are remote from a region of the first side surface that is adjacent the bore, a third mating surface and a fourth mating surface both raised from locations on the second side surface that are remote from a region of the second side surface that is adjacent the bore, a supply passage and a first tank return passage extending between the first and third mating surfaces, a second tank return passage extending between the second and fourth mating surfaces, all of the supply passage, the first tank return passage and the second tank return passage being remote from the bore;

a first passageway connecting the supply passage to the bore;

a second passageway connecting the first tank return passage to the bore;

a third passageway connecting the second tank return passage to the bore; and a control spool slidably received in the bore.

7. The valve section as recited in claim 6 further comprising a first fastener aperture and a second fastener aperture for receiving fasteners that secure the valve section to another valve section, the first fastener aperture extending between the first and third mating surfaces and the second fastener aperture extending between the second and fourth mating surfaces.

8. The valve section as recited in claim 6 wherein the first mating surface has a first annular groove around the supply passage, and a second annular groove around the first tank return passage; and the second mating surface has a third annular groove around the second tank return passage.

9. The valve section as recited in claim 8 further comprising a separate seal in each of the first annular groove, the second annular groove, and the third annular groove.

10. The valve section as recited in claim 6 further comprising a fifth mating surface raised from the first side surface; a sixth mating surface raised from the second side surface; and a load sense passage having openings in the fifth and sixth mating surfaces.

11. The valve section as recited in claim 10 further comprising a fourth passageway connecting the load sense passage to the bore.

12. The valve section as recited in claim 11 further comprising a fourth annular groove around the opening of the load sense passage in the fifth mating surface; and a seal in the fourth annular groove.

13. The valve section as recited in claim 6 further comprising a pair of workports communicating with the bore for connecting hydraulic conduits to the valve section.

14. A hydraulic valve assembly comprising a plurality of valve sections abutting side by side, wherein each valve section comprises:

a body having first and second side surfaces and an end surface, a bore extending into the body from the end surface, a first mating surface and a second mating surface both raised from locations on the first side surface that are remote from a region of the first side surface that is adjacent the bore, a third mating surface and a fourth mating surface both raised from locations on the second side surface that are remote from a region of the second side surface that is adjacent the bore, a supply passage and a first tank return passage extending between the first and third mating surfaces, a second tank return passage extending between the second and fourth mating surfaces, all of the supply passage, the first tank return passage and the second tank return passage being remote from the bore;

a first passageway connecting the supply passage to the bore;

a second passageway connecting the first tank return passage to the bore;

a third passageway connecting the second tank return passage to the bore; and a control spool slidably received in the bore.

15. The hydraulic valve assembly as recited in claim 14 further comprising an end cap attached to the second and fourth mating surfaces of one of the plurality of valve sections and closing the supply passage, the first tank return passage and the second tank return passage.

16. The hydraulic valve assembly as recited in claim 14 further comprising a ported end section attached to the first and third mating surfaces of another one of the plurality of valve sections, and having an inlet port communicating with the supply passage and an outlet port communicating with the first tank return passage and the second tank return passage.

17. The hydraulic valve assembly as recited in claim 14 wherein each valve section further comprises a first fastener aperture extending between the first and third mating surfaces; a second fastener aperture extending between the second and fourth mating surfaces; and further comprising a pair of fasteners extending into the first and second fastener apertures to secure the plurality of valve sections together.

18. The hydraulic valve assembly as recited in claim 14 wherein the first mating surface of each valve section has a first annular groove around the supply passage and a second annular groove around the first tank return passage; and the second mating surface of each valve section has a third annular groove around the second tank return passage; and further comprising a separate seal in each of the first, second and third annular grooves.

19. The hydraulic valve assembly as recited in claim 14 wherein each valve section further comprises a fifth mating surface raised from the first side surface; a sixth mating surface raised from the second side surface; and a load sense passage having openings in the fifth and sixth mating surfaces and coupled to the bore.

20. The hydraulic valve assembly as recited in claim 14 wherein each valve section further comprises a pair of workports communicating with the bore for connecting hydraulic conduits to that valve section.

* * * * *